United States Patent
Kinoshita et al.

(10) Patent No.: US 7,975,278 B2
(45) Date of Patent: Jul. 5, 2011

(54) DIGITAL BROADCAST RECEIVING APPARATUS

(75) Inventors: Kosuke Kinoshita, Daito (JP); Keisuke Tsukamoto, Daito (JP)

(73) Assignee: Funeral Electric Co., Ltd., Daito-shi, Osaka (JP)

( * ) Notice: Subject to any disclaimer, the term of this patent is extended or adjusted under 35 U.S.C. 154(b) by 859 days.

(21) Appl. No.: 11/998,891

(22) Filed: Dec. 3, 2007

(65) Prior Publication Data

US 2008/0141295 A1 Jun. 12, 2008

(30) Foreign Application Priority Data

Dec. 4, 2006 (JP) ................................. 2006-326862

(51) Int. Cl.
*H04N 7/16* (2006.01)

(52) U.S. Cl. .......................................... 725/28; 725/25

(58) Field of Classification Search .................... 725/25, 725/28, 39
See application file for complete search history.

(56) References Cited

FOREIGN PATENT DOCUMENTS
JP  2001-177780  6/2001

*Primary Examiner* — Ngoc Vu
(74) *Attorney, Agent, or Firm* — Yokoi & Co., U.S.A., Inc.; Toshiyuki Yokoi

(57) ABSTRACT

There is provided a digital broadcast receiving apparatus capable of notifying a user that an item in itself exists even if a blank exists in the name portion of an item in the variable RRT to prevent the user from omitting setting. The microcomputer 18 acquires a rating region table (RRT) from a transport steam (TS) signal and attaches a flag capable of restricting viewing to each level in the RTT based on inputs entered by a user while displaying the RTT on a screen. If rating information including the TS signal expresses the level on which the flag capable of restricting viewing is attached, viewing of a program including the rating information is restricted, a blank in the level, item and table names included in the RRT is detected and the detected blank is substituted with a predetermined character string.

9 Claims, 9 Drawing Sheets

FIG. 2

| RATING TABLE NAME | | ××× Rating | | |
|---|---|---|---|---|
| | | TV-AA | TV-BB | TV-CC |
| | | ORDER | CATEGORY | CATEGORY |
| LEVEL | 0 | .../... | .../... | .../... |
| | 1 | UU | DD | JFK |
| | 2 | VVV | S | JJ |
| | 3 | WW | RR | PP |

FIG. 3

Format of the Rating Region Table. Source: ATSC A/65b (PSIP Specification)

| Syntax | No. of bits | Format |
|---|---|---|
| rating_region_table_section () { | | |
|     table_id | 8 | 0xCA |
|     section_syntax_indicator | 1 | '1' |
|     private_indicator | 1 | '1' |
|     reserved | 2 | '11' |
|     section_length | 12 | uimsbf |
|     table_id_extension { | | |
|         reserved | 8 | 0xFF |
|         rating_region | 8 | uimsbf |
|     } | | |
|     reserved | 2 | '11' |
|     version_number | 5 | uimsbf |
|     current_next_indicator | 1 | '1' |
|     section_number | 8 | uimsbf |
|     last_section_number | 8 | uimsbf |
|     protocol_version | 8 | uimsbf |
|     rating_region_name_length | 8 | uimsbf |
|     rating_region_name_text() | var | |
|     dimensions_defined | 8 | uimsbf |
|     for (i = 0; i < dimensions_defined; i++) { | | |
|         dimension_name_length | 8 | uimsbf |
|         dimension_name_text() | var | |
|         reserved | 3 | '111' |
|         graduated_scale | 1 | bslbf |
|         values_defined | 4 | uimsbf |
|         for (j = 0; j < values_defined; j++) { | | |
|             abbrev_rating_value_length | 8 | uimsbf |
|             abbrev_rating_value_text() | var | |
|             rating_value_length | 8 | uimsbf |
|             rating_value_text() | var | |
|         } | | |
|     } | | |
|     reserved | 6 | uimsbf |
|     descriptors_length | 8 | uimsbf |
|     for (i = 0; i < N; i++) { | | |
|         descriptor | | |
|     } | | |
|     CRC_32 | 32 | rpchof |
| } | | |

FIG. 4

Format of the Content Advisory Descriptor. Source: ATSC A/65b (PSIP Specification)

| Syntax | No. of bits | Format |
|---|---|---|
| content_advisory_descriptor () { | | |
| descriptor_tag | 8 | 0x87 |
| descriptor_length | 8 | uimsbf |
| reserved | 2 | '11' |
| rating_region_count | 6 | |
| for (i = 0; i < rating_region_count; i++) { | | |
| rating_region | 8 | uimsbf |
| rated_dimensions | 8 | uimsbf |
| for (j = 0; j < rated_dimensions; j++) { | | |
| rating_dimension j | 8 | uimsbf |
| reserved | 4 | '1111' |
| rating_value | 4 | uimsbf |
| } | | |
| rating_description_length | 8 | uimsbf |
| rating_description_text() | var | |
| } | | |
| } | | |

DIGITAL BROADCAST RECEIVING APPARATUS

CROSS-REFERENCES TO RELATED APPLICATIONS

The present application is related to the Japanese Patent Application No. 2006-326862, filed Dec. 4, 2006, the entire disclosure of which is expressly incorporated by reference herein.

BACKGROUND OF THE INVENTION

1. Field of the invention

The present invention relates to a digital broadcast receiving apparatus, and in particular, to a digital broadcast receiving apparatus with a function of restricting viewing.

2. Description of the Related Art

In North America (U.S. and Canada), a television for receiving a television broadcasting signal is legally obligated to be equipped with a V chip by which a viewer can restrict the reception and display of inappropriate video and sound such as a violence scene and an obscene image which parents do not want their children to see. Specifically, a Rating Region Table (hereinafter, referred to as fixed RRT) formed of a predetermined TV Rating and MPAA Rating is stored in a conventional V chip regulated by CEA-766-A in a television and viewing is restricted based on the fixed RRT.

However, all the digital television broadcast receiving apparatus with a screen size of 13 inches or more were legally obligated to be equipped with a V chip 2.0 by the Federal Communications Commission in the US on Mar. 15, 2006 so that the Rating Region Table can be changed and enlarged. The V chip 2.0 allows a television to recognize the Rating Region Table transmitted during broadcasting (hereinafter, referred to as a variable RRT) to restrict viewing of television programs.

The variable RRT is formed and transmitted by each broadcasting station. Title portions of items may be blank due to omission of data input. If a blank exists, a user cannot determine whether the item can be set to be confused, as a result, the user may omit the items to be basically set.

As one of techniques coping with the case where a blank exists in information obtained from a broadcasting signal, Japanese Patent Application Laid-Open No. 2001-177780 describes a technique in which if complete information cannot be obtained from an electronic program a user is notified based on the file of information on broadcasting stations stored in advance that which channel information is omitted.

Although a blank in the name portion is caused by error at a broadcasting station, the blockade of programs is still required as long as it is specified by the law. The technique described above in Japanese Patent Application Laid-Open No. 2001-177780 is such that display is performed as to which information should be input based on information to be stored in advance. The technique does not cope with a blank in which a name to be written is originally unclear.

BRIEF SUMMARY OF THE INVENTION

It is an object of the present invention to provide a digital broadcast receiving apparatus capable of notifying a user that an item in itself exists even if a blank exists in the name portion of an item in the variable RRT to prevent the user from omitting setting.

The present invention discloses a digital broadcast receiving apparatus that acquires a parental level to set to a program of digital television broadcast to restrict viewing of the program according to the parental level, the digital broadcast receiving apparatus, comprising:

a table acquiring unit that acquires a table of the parental level from a digital television broadcast signal;

a restriction-item setting unit that sets any items in the table as a restriction item based on inputs entered by a user while displaying the table on a screen;

a restricting unit that restricts viewing of the program if the parental level of the program corresponds to the restriction item in the table;

a blank detecting unit that detects a blank name of the item included in the table; and a blank substituting unit that substitutes a blank with a predetermined character string.

In the above configuration, the table acquiring unit acquires the table of a view rank from the digital broadcast signal, the restriction-item setting unit determines whether which item in the above table should be set as a viewing restricting item based on the input entered by the user with the table displayed on a screen, the viewing restricting unit restricts viewing when the view rank corresponds to the viewing restriction item in the table, the blank detecting unit detects a blank in the names included in the table and the blank substituting unit substitutes the blank with a predetermined character string.

The above view rank refers to information to be set to each program and shows a category of a program and a viewer ineligible for a program. The table refers to a list with categorized items and viewers ineligible for a program. The view rank represents any of the items in the table. The viewing restricting item refers to an item restricting viewing when any of the items is designated by the view rank. Viewing restriction is not performed on the items which are not set to the restriction items even if the items are designated by the view rank. The name refers to a name simply expressing category of a program and a viewer ineligible for a program and is displayed on the screen when a user set the viewing restricting item. The blank means that the item name has not been set. In addition, the name may represent not only the name of an item which the view rank designates but also a name as a generic name collecting a plurality of the items or the table in itself. A blank detected by the blank detecting unit may be a generic name collecting a plurality of names and items of the table in itself.

If the blank detecting unit detects a blank, a restriction-item strengthening unit may be provided which sets the viewing-restriction item to severely restrict viewing as compared with the setting of the viewing-restriction item based on inputs entered by the user. The expression "to severely restrict viewing" means that one or more of the items which the user did not set as a viewing-restriction item is set as a viewing-restriction item, aside from the viewing-restriction items set by the user. However, this is not performed provided that the user set all the items as the viewing-restriction items.

If the blank detecting unit detects a blank, a restriction-item strengthening unit may be provided in which items which the blank is detected in the table are set to the viewing restriction item. In other words, setting the item which the blank is detected to the viewing restriction item can prevent the user from omitting setting of the viewing restriction even if the user cannot obtain contents restricted by the item from the name of the item.

If the blank detecting unit detects a blank, a restriction-item strengthening unit may be provided in which all the items which can be set as a viewing restriction item in the above table are set to viewing restriction items. That is to say, setting not only the items which a blank is detected but also all the items to the viewing restriction item allows completely preventing omission of setting of the viewing restriction.

The table acquiring unit may be formed such that the table is reacquired if the blank detecting unit detects a blank. That is to say, even if the table is blank before it is reacquired, a table in which a name is set to the item which is blank at the time of reacquiring may be included in digital broadcast broadcasting signal and transmitted. In this case, reacquiring the table enables acquiring the table obtaining the name for the blank.

If the blank detecting unit detects a blank, a restriction-item strengthening unit may be provided in which all the items which can be set as a viewing restriction item in the table are set to viewing restriction items if the table acquiring unit reacquires the table and the blank detecting unit detects a blank if the blank detecting unit still detects a blank after the table acquiring unit has reacquired the table. In other words, setting of the viewing restriction item is strengthened only if the blank still exists after the table is reacquired, thereby proper name of the item can be acquired if the table is renewed. Setting of the viewing restriction item is strengthened only if the table is not renewed.

If the blank detecting unit detects a blank, the table acquiring unit may be formed such that the table is reacquired if the blank detected by the blank detecting unit coincides with the item shown by the above view rank. That is to say, the table is reacquired only when the name of the item designated by the view rank is blank, so that it is enabled to effectively process the reacquisition of the table.

One aspect of the present invention provides a digital broadcast receiving apparatus that acquires a parental level to be set to a program of digital television broadcast to restrict viewing of the program according to the parental level, the digital broadcast receiving apparatus, comprising:

- a microcomputer which acquires a variable Rating Region Table (RRT) and a Content Advisory Descriptor (CAD) from a transport stream signal of the digital television broadcast signal to sample a predetermined information; and
- a nonvolatile memory that can memorize the variable RRT and memorizes a flag capable of restricting viewing of the RRT;
- the microcomputer determines whether character information is written in the table, item and level names in the variable RRT,
- if the table name is blank, the microcomputer sets the flags capable of restricting viewing to all the levels of all the items in the variable RRT while substituting the table name with a predetermined character string that means the table name does not exist,
- if the item name is blank, the microcomputer sets the flags capable of restricting viewing to all the levels of the item while substituting the item with a predetermined character string comprising of a combination of a character string meaning an item and a numeric value expressing an order of the item in the variable RRT, and
- if the level name is blank, the microcomputer substitutes the level name with a predetermined character string comprising of a combination of a character string meaning a level and a numeric value meaning a level number, and the microcomputer sets the flag capable of restricting viewing to the level if the block type of the item of the level is a category type, and the microcomputer sets the flag capable of restricting viewing to all the levels not greater than the level of the item if the block type of the item of the level is an order type.

These and other features, aspects, and advantages of the invention will be apparent to those skilled in the art from the following detailed description of preferred non-limiting exemplary embodiments, taken together with the drawings and the claims that follow.

BRIEF DESCRIPTION OF THE DRAWINGS

It is to be understood that the drawings are to be used for the purposes of exemplary illustration only and not as a definition of the limits of the invention. Throughout the disclosure, the word "exemplary" is used exclusively to mean "serving as an example, instance, or illustration." Any embodiment described as "exemplary" is not necessarily to be construed as preferred or advantageous over other embodiments.

Referring to the drawings in which like reference character(s) present corresponding parts throughout:

FIG. 2 is an example of configuration of a rating region table (RRT);

FIG. 3 is a configuration of section of an RRT;

FIG. 4 is a configuration of section of a content advisory descriptor (CAD);

DETAILED DESCRIPTION OF THE INVENTION

The detailed description set forth below in connection with the appended drawings is intended as a description of presently preferred embodiments of the invention and is not intended to represent the only forms in which the present invention may be constructed and or utilized.

For purposes of illustration, programs and other executable program components are illustrated herein as discrete blocks, although it is recognized that such programs and components may reside at various times in different storage components, and are executed by the data processor(s) of the computers.

The present embodiment is described below in the following order:

(1) Configuration of the digital broadcast receiving apparatus
(2) Information on viewing restriction
(3) Process at the time of detecting a blank in Rating Region Table
(4) Viewing restriction strengthening process at the time of detecting a blank in a Rating Region Table
(5) First modification of process at the time of detecting a blank in a Rating Region Table
(6) Second modification of process at the time of detecting a blank in a Rating Region Table
(7) Conclusion (1) Configuration of the Digital Broadcast Receiving Apparatus The embodiments of the present invention are described below with reference to FIGS. 1 to 9. Although a description is made using a digital television which receives digital broadcasting and displays a video corresponding to the broadcasting signal thereof on a screen in the present embodiment, a display unit does not always need to be integrally formed with the digital television. It is needless to say that the digital television may be combined with a reproducing and a recording device for a recording medium.

Figure 1:
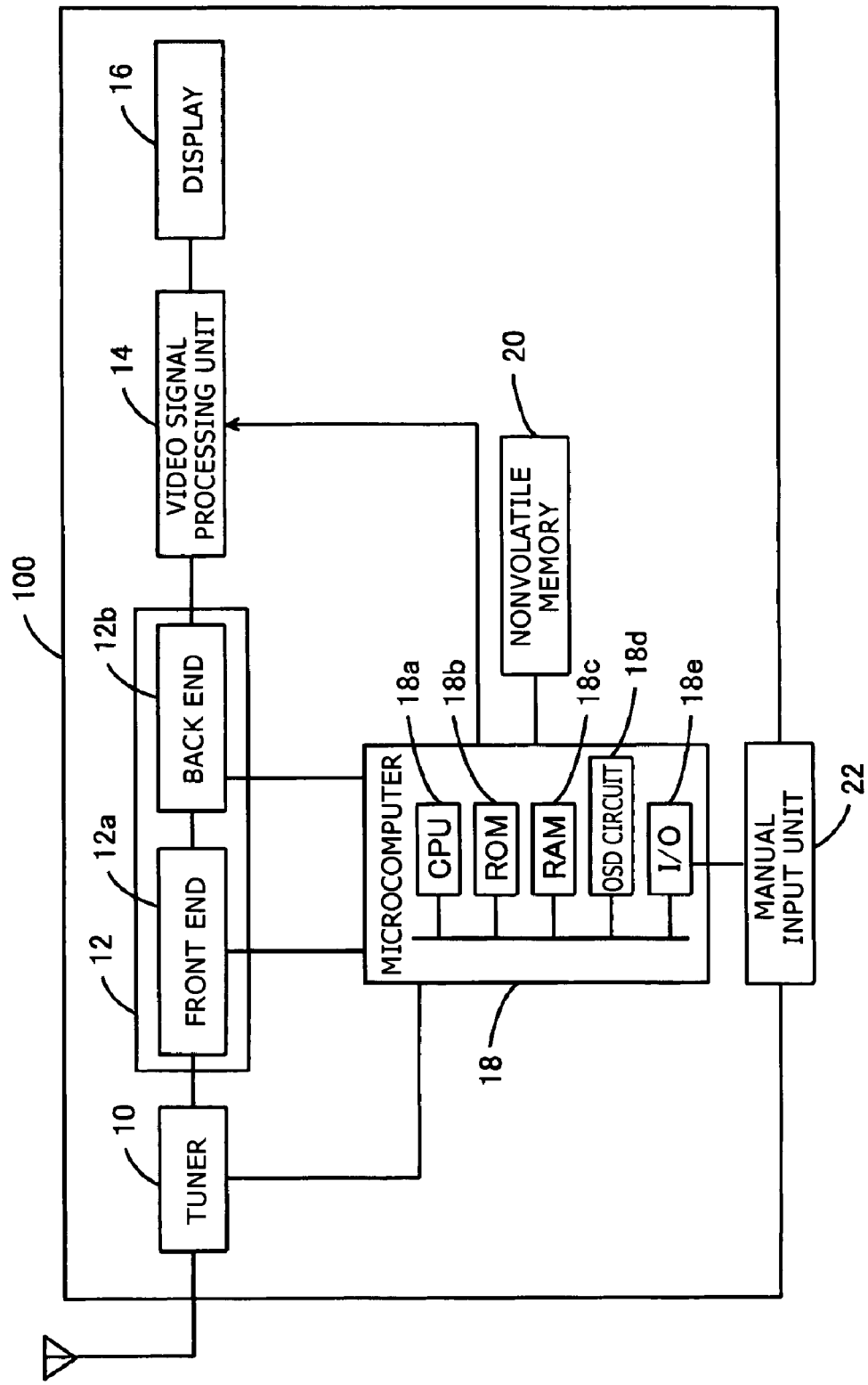
FIG. 1 is a schematic block diagram of digital television.

FIG. 1 is a schematic block diagram of a digital television 100. In the figure, the digital television 100 includes a tuner 10, a microcomputer 18, a digital demodulation circuit 12, a video signal processing unit 14, a display 16 and a nonvolatile memory 20.

The microcomputer 18 is electrically connected to the above components and controls the operation of the entire digital television 100. The microcomputer 18 includes a CPU 18a, a ROM 18b, a RAM 18c, an OSD circuit 18d and an input-output circuit 18e. That is to say, in the microcomputer 18, the CPU 18a controls the operation of the digital television 100 based on the program and data stored in the ROM 18b with the RAM 18c as a work area.

The microcomputer 18 receives a voltage signal input from a manual input unit 22 to the input-output circuit 18e and generates an on-screen display (OSD) signal corresponding to the received manual input. For example, the microcomputer 18 generates the OSD signal which causes a screen to display a predetermined operation items, receives manual inputs for selecting any of operation items displayed on the screen of the display 16 from the manual input unit 22 and executes a setting process corresponding to the selected operation item.

The tuner 10 is of a synthesizer type. The tuner 10 receives PLL data as a channel-select control signal, in other words, data on division ratio of a variable frequency divider in a PLL loop. The tuner 10 receives the PLL data transmitted from the microcomputer 18, samples an intermediate frequency signal (IF) in a desired frequency band from any of broadcasting signals corresponding to each channel of digital television broadcasting received through an antenna to supply the IF to the digital demodulation circuit 12. Thus, the tuner 10 selects one of a plurality of channels.

The microcomputer 18 receives a voltage signal input from the manual input unit 22 through the input-output circuit 18e to perform a controlling process. For example, when a channel switching signal is input into the microcomputer 18 from the manual input unit 22, the microcomputer 18 recognizes a channel to be selected at that point and transmits a channel-select control signal for receiving a television broadcasting signal of the selected channel to the tuner 10. When a selection signal for causing the display to display a setting screen is input into the microcomputer 18, the microcomputer 18 causes the OSD circuit 18d to generate the OSD signal based on image information and character information, outputs the OSD signal to the video signal processing unit 14 and causes the display 16 to display the OSD signal. While viewing the OSD display, the user enters inputs to perform various settings.

The digital demodulation circuit 12 is composed of a front end 12a and a back end 12b. The front end 12a includes a digital IF and a demodulation unit. The digital IF to which an intermediate frequency signal is input has an A/D converter and the demodulation unit which receives a signal from the digital IF has a channel equalizer and an error correction decoding unit. That is to say, the digital IF and the demodulation unit convert the input intermediate frequency signal into a digital signal and subject the digital signal demodulated based on the control information from the microcomputer 18 to a so-called ghost cancellation. Furthermore, the digital IF and the demodulation unit correct a bit error occurred in a transmission path to obtain a transport stream (TS) signal.

The TS signal is input to the back end 12b. The back end 12b is equipped with a descrambling unit, a demultiplexing unit and an MPEG decoder. The TS signal is usually scrambled, so that video and audio cannot be properly reproduced as is. For this reason, the descrambling unit subjects the TS signal to a descrambling process to restore the TS signal to a reproducible data arrangement. The descrambled TS signal is multiplexed with a video signal, audio signal and character information. The TS signal is supplied to the demultiplexing unit. The demultiplexing unit subjects the input data to a demultiplexing process. In other words, multiplexing is released herein.

Multiplexing is released by the demultiplexing process to provide MPEG data in which video and audio signals are compressed by a predetermined system. The MPEG data is supplied to the MPEG decoder and subjected to a decompression process in the MPEG decoder, i.e., the MPEG data is subjected to a MPEG decoding process. The MPEG decoding process generates digital video and audio signals. The digital video signal is output to the video signal processing unit 14. On the other hand, the digital audio signal is converted into an analog audio signal by a predetermined D/A conversion unit and the analog audio signal is output to a loudspeaker (not shown).

The video signal processing unit 14 receives the digital video signal, subjects it to a predetermined signal processing and outputs it to the display 16. Various video display apparatus such as a CRT, a liquid crystal panel, a plasma display panel may be used as the display 16. In the present embodiment, a liquid crystal panel is used as an example.

The video signal processing unit 14 includes a pixel-number converting circuit, a picture quality adjusting circuit and an output processing circuit. The pixel-number converting circuit receives a digital video signal and generates RGB signals for one screen displayed on the liquid crystal panel, while subjecting the video signal to a scaling process. The picture quality adjusting circuit adjusts brightness, contrast, black and white balance and sharpness of the RGB signals subjected to the scaling process by the pixel-number converting circuit. The output processing circuit subjects the RGB signals subjected to a picture quality adjustment to gamma correction and dither process, adds a background signal, an OSD signal and a blanking signal to the RGB signals and outputs them to the liquid crystal panel to display an image.

The display 16 is composed of, for example, a liquid crystal panel and a driving circuit for driving the liquid crystal panel. The driving circuit generates a driving signal based on the video signal input from the video signal processing unit 14. The driving signal drives the pixels in the liquid crystal panel. It is needless to say that a plasma display panel and a driving circuit therefore, and a picture tube driven by a vertical and a horizontal deflection circuit may be used as the display 16.

(2) Information on Viewing Restriction

The TS signal includes program specific information protocol (PSIP) data as program arrangement information. The PSIP data includes an event information table (EIT) for transmitting information as to a program such as names and broadcasting date of individual programs and a rating region table (RRT) for transmitting rating information (view rank) of the V chip. The nonvolatile memory 20 stores the rating region table (RRT) in advance at the time of shipment. Hereinafter, the RRT included in the TS signal is taken to be a variable RRT and the RRT stored in advance in the nonvolatile memory 20 is taken to be a fixed RRT. The microcomputer 18 acquiring the variable RRT from the TS signal forms a table acquiring unit.

FIG. 2 shows an example of configuration of the RRT. The variable and the fixed RRT are fundamentally the same in configuration. The variable RRT is different from the fixed RRT in that the number of items and the number of levels in each item can be changed at a broadcasting station. The RRT is composed of a rating table name, rating item name, block type and level name. The rating table name represents a name of each RRT. The rating item is formed differently for each of viewing restriction methods. For this reason, if the item is oriented to a viewing restriction method for a specific area, an area name is taken to be an item name. If the item is oriented to a viewing restriction method for a specific broadcast station, a broadcasting station name is taken to be an item name. The block type includes a category and an order type. The level name in the category type as the block type is provided with a predetermined key word expressing contents to be broadcasted. It can be set on a level basis whether viewing can be restricted or not. On the other hand, the level name in the order type as the block type is a name which can be arranged regularly (for example, in age) and an item in which a regulation level is increased stepwise according as a level increases. For this reason, in the items of the order type, once a viewing restriction is set to any level, the viewing restriction is set to all the levels including levels lower than the level.

The variable RRT is a table formed at the discretion of a broadcasting station. The microcomputer 18 samples the variable RRT from the TS signal in a predetermined timing to store it in the nonvolatile memory 20. The acquired variable RRT is associated with the channel of a transmission source and stored in the nonvolatile memory 20. The contents of the fixed RRT stored in advance in the nonvolatile memory 20 at the time of shipment are not changed unlike the variable RRT based on the V chip 2.0. The fixed RRT is generally composed of the TV rating which provides the restriction of viewing of a television broadcast signal and the MPAA rating which restricts the viewing of a video reproduced from a recording medium such as a DVD.

The EIT includes a descriptor called a content advisory descriptor (CAD) on which rating information (view rank) is written which shows that viewing is restricted at which level of which item in which RRT. The CAD also has a descriptor showing that viewing should be restricted based on which version of the RRT. The descriptor is associated with either of the fixed and the variable RRT. A determination is made whether the fixed or the variable RRT is used for viewing restriction depending on whether the descriptor coincides with the descriptor of which RRT. Specifically, the descriptor of the CAD is compared with the descriptor of the variable RRT and if the descriptor of the CAD coincides with the descriptor of the variable RRT, viewing is restricted based on the variable RRT, if not, viewing is restricted based on the fixed RRT.

FIGS. 3 and 4 show the configuration of section of the RRT and the CAD respectively. In FIG. 3, the descriptor of the variable RRT is stored in rating_region. The table name of the variable RRT is stored in rating_region_name_text( ). The item name of the variable RRT is stored in dimension_name_text( ). The level name of the variable RRT is stored in rating_value_name( ). In FIG. 4, a descriptor corresponding to either of the RRTs is stored in rating_region. That is to say, the rating_region of the RRT is compared with the rating_region of the CAD to enable discriminating an RRT used for a viewing restriction.

Figure 5:
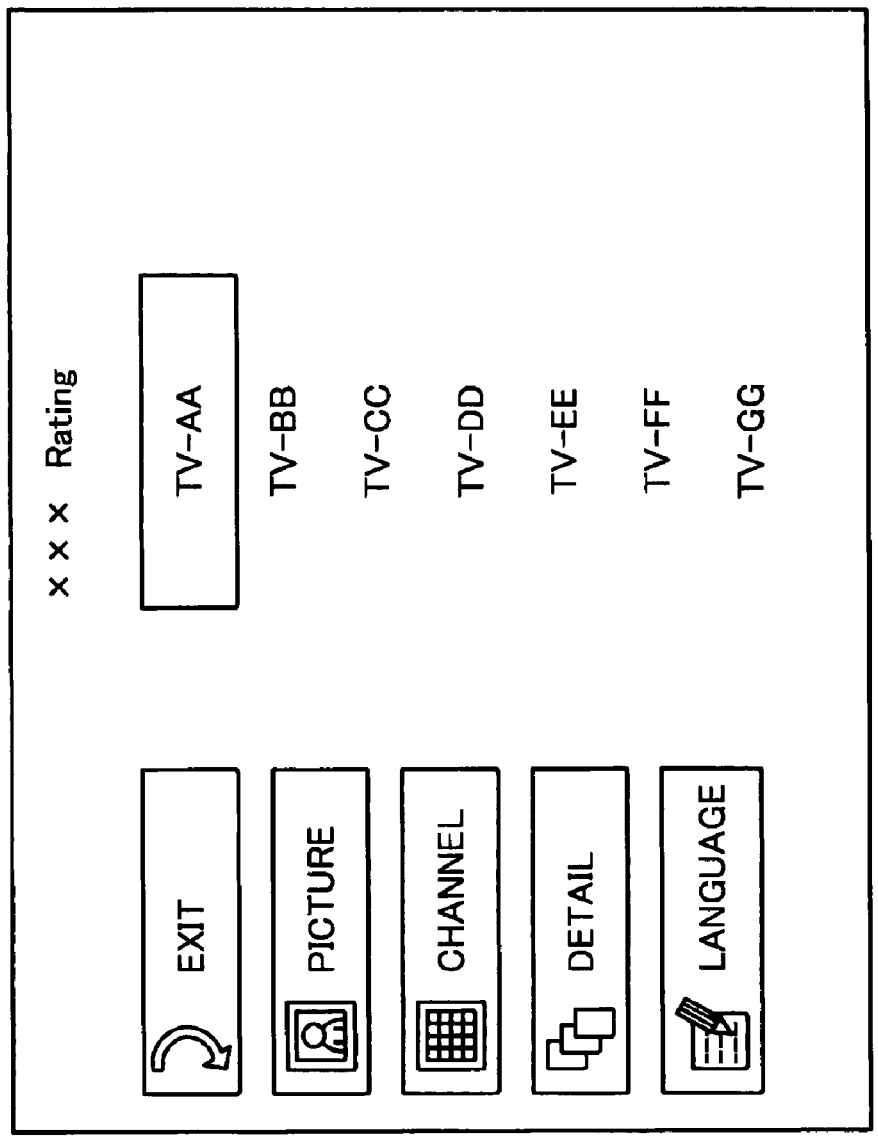
FIG. 5 is an example of a screen to which a flag capable of restricting viewing is set.
Figure 6:
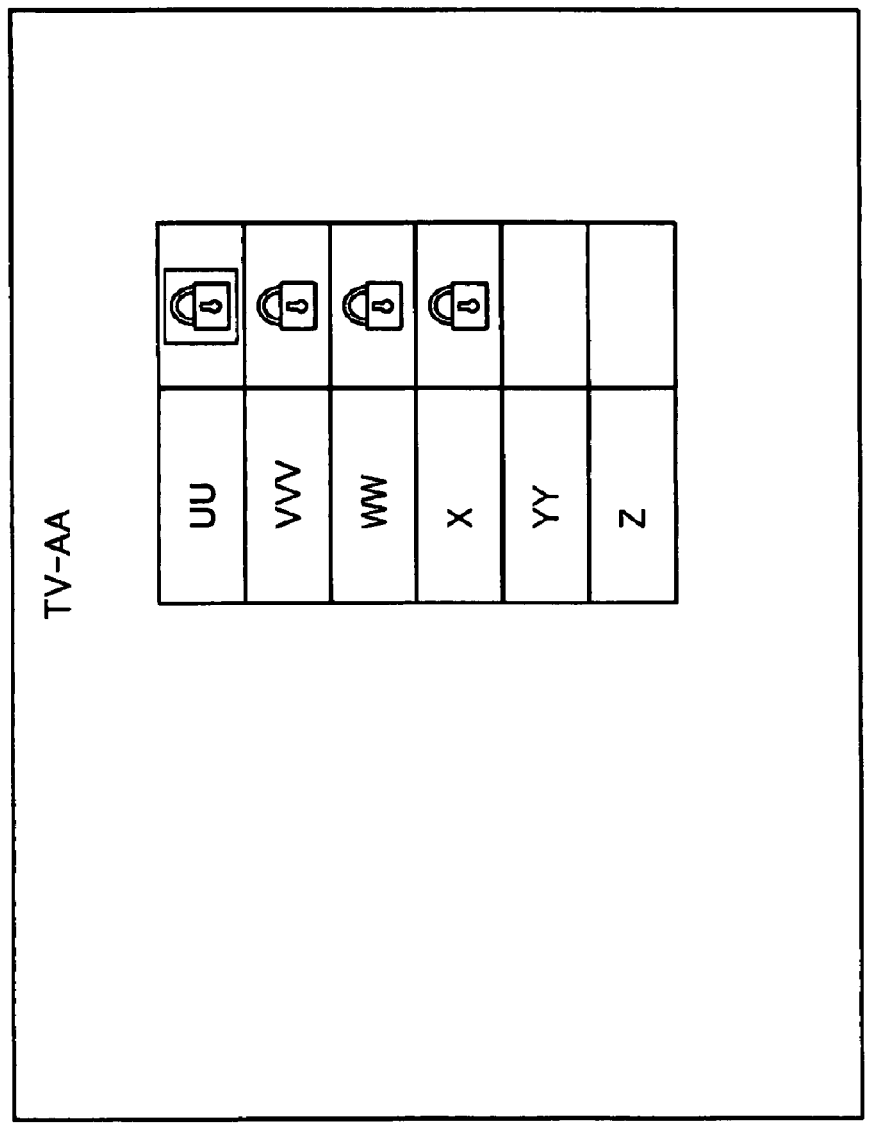
FIG. 6 is an example of a screen to which a flag capable of restricting viewing is set.

If the level is designated by rating information, a user sets to each level of each item in each RRT whether viewing is restricted based on the designation. This setting is performed such that the user sets whether viewing is restricted when each level of each item is designated by rating information on the setting screen of the RRT. Specifically, when the user enters a predetermined input, the item selection screen of the RRT is displayed as illustrated in FIG. 5. When any of the items in FIG. 5 is selectively input, a screen for setting whether viewing is restricted at each level is displayed, as illustrated in FIG. 6. Each level is given a name simply expressing contents of viewing restriction performed at this level. The user views the names, determines a level which the user wants to restrict viewing and attaches a flag which is capable of restricting viewing to a desired level. This means that, if the rating information of the CAD designates the level to which the flag capable of restricting viewing is attached, viewing is restricted and if the rating information of the CAD designates the level to which the flag capable of restricting viewing is not attached, viewing is restricted. Thus, the microcomputer 18 for performing a process for restricting viewing of a program based on the variable and fixed RTT and rating information forms a viewing restriction unit. The microcomputer 18 for performing a process for attaching the flag capable of restricting viewing to each level of the RRT based on the input entered by the user forms a restriction-item setting unit.

(3) Process at the Time of Detecting a Blank in Rating Region Table

Since the variable RRT is formed and transmitted by a broadcasting station and it can be changed or extended, names given a rating table, a rating item and a level displayed on the screen on which the viewing restriction is set may be kept blank and transmitted. For this reason, the present invention proposes means for detecting such a blank and removing such a drawback that nothing is displayed on a setting screen.

Figure 7:
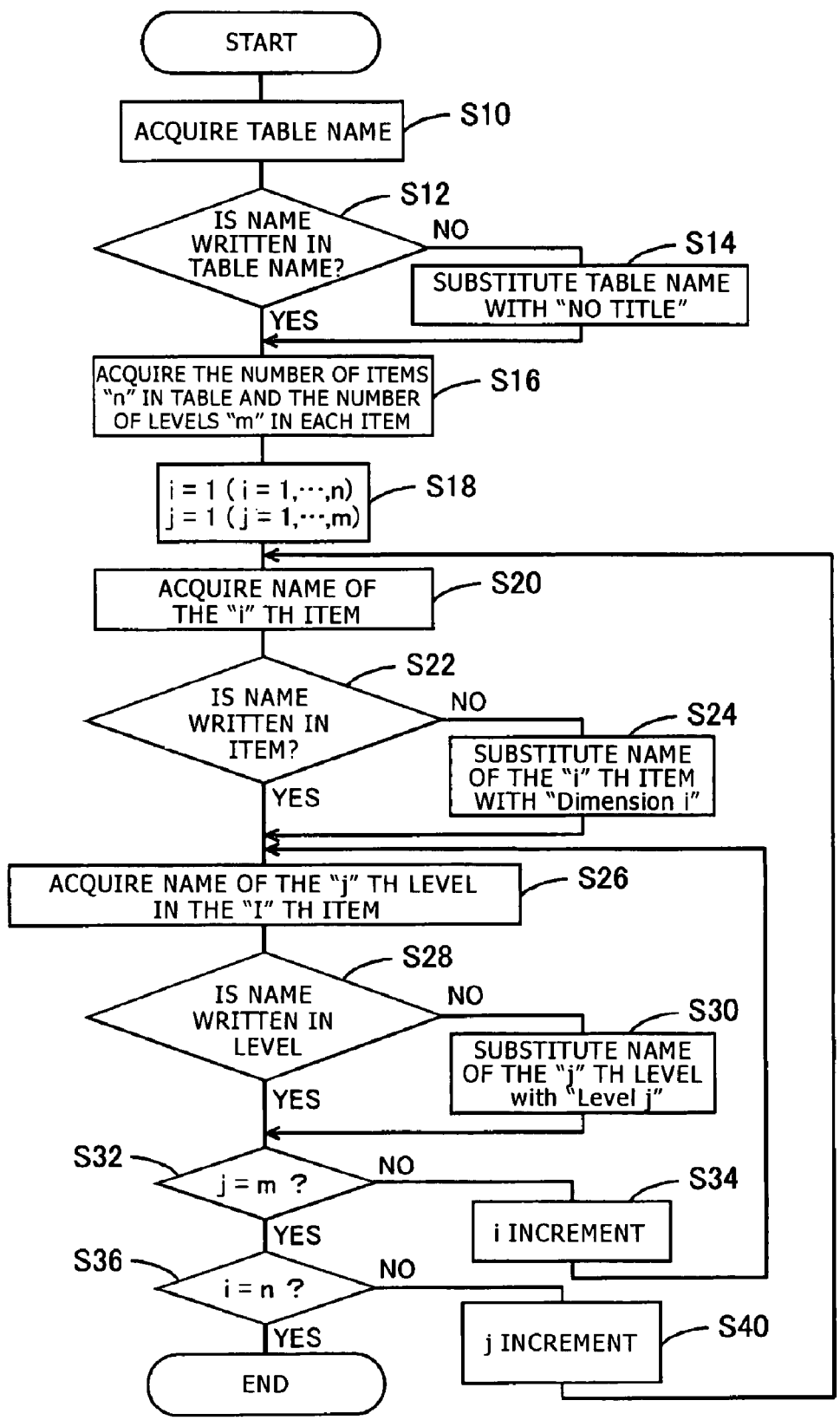
FIG. 7 is a flow chart illustrating the process of a microcomputer detecting a blank in a variable RRT.

A process which detects and substitutes a blank in the variable RRT is described with reference to FIG. 7. FIG. 7 is a flow chart illustrating the process of the microcomputer 18 which detects a blank in the variable RRT. The process may be executed at the time of acquiring the variable RRT from the broadcast signal or executed at a predetermined time interval.

When the process starts, the name of an RRT to be processed is acquired at step S10 and the process proceeds to step S12. Specifically, the information acquired from rating_region_name_text( ) in the configuration of section of the RRT and stored in the nonvolatile memory 20 is acquired as a table name. The table name corresponds to "XXX Rating" in the RRT in FIG. 2.

At step S12, a determination is made as to whether character information exists in the table name acquired at step S10. The character information may be such an information that it can be recognized as a character string based on a prescribed character code or may be an information if any information exists even if characters may get garbled. If character information exists in the table name, it is regarded that the condition is established and the process proceeds to step S16. On the other hand, if no character information exists in the table name, it is regarded that the condition is not established and the process proceeds to step S14 where the table name is substituted with a predetermined character string which means that a title does not exist (for example, with "No Title"). The process proceeds to step S16.

At step S16, the number of items "n" in the RRT to be processed and the number of levels of each item "m" are acquired and the process proceeds to step S18. The number of levels "m" is a value different with an item. At step S18, "i" and "j" counting the numbers of items and levels are set at "1" and the process proceeds to step S20. Where, "i" and "j" are an integer and "i"=1, ..., n and "j"=1, ..., m.

At step S20, the name of the "i"th item is acquired and the process proceeds to step S22. Specifically, the information acquired from dimension_name$_{13}$ text( ) in the configuration of section of the RRT and stored in the nonvolatile memory 20 is acquired as a table name. This item name corresponds to TV-AA, TV-BB and TV-CC in the RRT in FIG. 2.

At step S22, a determination is made as to whether character information exists in the item name acquired at step S20. If character information exists in the item name, it is regarded that the condition is established and the process proceeds to step S26. On the other hand, if no character information exists in the item name, it is regarded that the condition is not established and the process proceeds to step S24 where the item name is substituted with a predetermined character string consisting of a combination of a character string meaning an item and a numeric value expressing the order of the item in the variable RRT (with "Dimension i" for the "i"th level, for example). The process proceeds to step S26.

At step S26, the name of the "j"th level of the "i"th item is acquired and the process proceeds to step S28. Specifically, the information acquired from rating_value_text( ) in the configuration of section of the RRT and stored in the nonvolatile memory 20 is acquired as a table name. The item name corresponds to UU, VVV and WW in the item name of TV-AA in the RRT in FIG. 2.

At step S28, a determination is made as to whether character information exists in the level name acquired at step S26. If character information exists in the level name, it is regarded that the condition is established and the process proceeds to step S32. On the other hand, if no character information exists in the level name, it is regarded that the condition is not established and the process proceeds to step S30 where the level name is substituted with a predetermined character string consisting of a combination of a character string meaning a level and a numeric value expressing a level number (with "Level "j" in the "j"th level, for example). The process proceeds to step S32.

At step S32, a determination is made as to whether the names of all the levels are checked in the "i"th item. That is to say, a determination is made whether j=m. If j=m, it is regarded that the condition is established, and the process proceeds to step S36. On the other hand, if "j" is not equal to "m," it is regarded that the condition is not established, and the process proceeds to step S34 where "j" is incremented and the processes are repeated from step S26.

At step S36, a determination is made as to whether the names and levels of all the items are checked. That is to say, a determination is made whether i=n. If i=n, it is regarded that the condition is established, and the process is terminated. On the other hand, if "i" is not equal to "n," it is regarded that the condition is not established, and the process proceeds to step S40 where "i" is incremented and the processes are repeated from step S20.

The microcomputer 18 executing the processes of steps S10, S12, S16 to S22, S26, S28, and S32 to S40 forms the blank detecting unit. The microcomputer 18 executing the processes of steps S14, S24 and S30 forms the blank substituting unit.

4) Viewing Restriction Strengthening Process at the Time of Detecting a Blank in a Rating Region Table As described above, if a blank exists in the variable RRT, the blank is substituted with a predetermined character string, thereby enabling notifying the user that the table, item and level exist and viewing restriction can be set. However, this process cannot complement specific contents to be fundamentally written. Therefore, the user cannot comprehend that the item and level, i.e., the table in itself is intended for what in viewing restriction. For this reason, the user hastily concludes that viewing restriction cannot be set in spite that viewing restriction should be originally set, as a result, inappropriate video and audio may be displayed and output.

To cope with such a situation, if a blank is detected, viewing restriction may be strengthened. That is to say, if the microcomputer 18 detects a blank, the microcomputer 18 further widens the designable range of viewing restriction based on the rating information as compared with the designable range of viewing restriction set by the user. Specifically, viewing restriction can be designated to the table, item and level in which the blank of the name is detected based on the rating information irrespective of setting by a user. When the blank of level name is detected, a flag capable of restricting viewing is attached to all the levels lower than the level in which the blank is detected, viewing restriction can be designated for an item in which the order block is set to the block type. It is needless to say that, if a blank exists, the flag capable of restricting viewing may be designated as a viewing restriction on all the levels of all the items in the variable RRT. This configuration enables eliminating the omission of viewing restriction.

Figure 8:
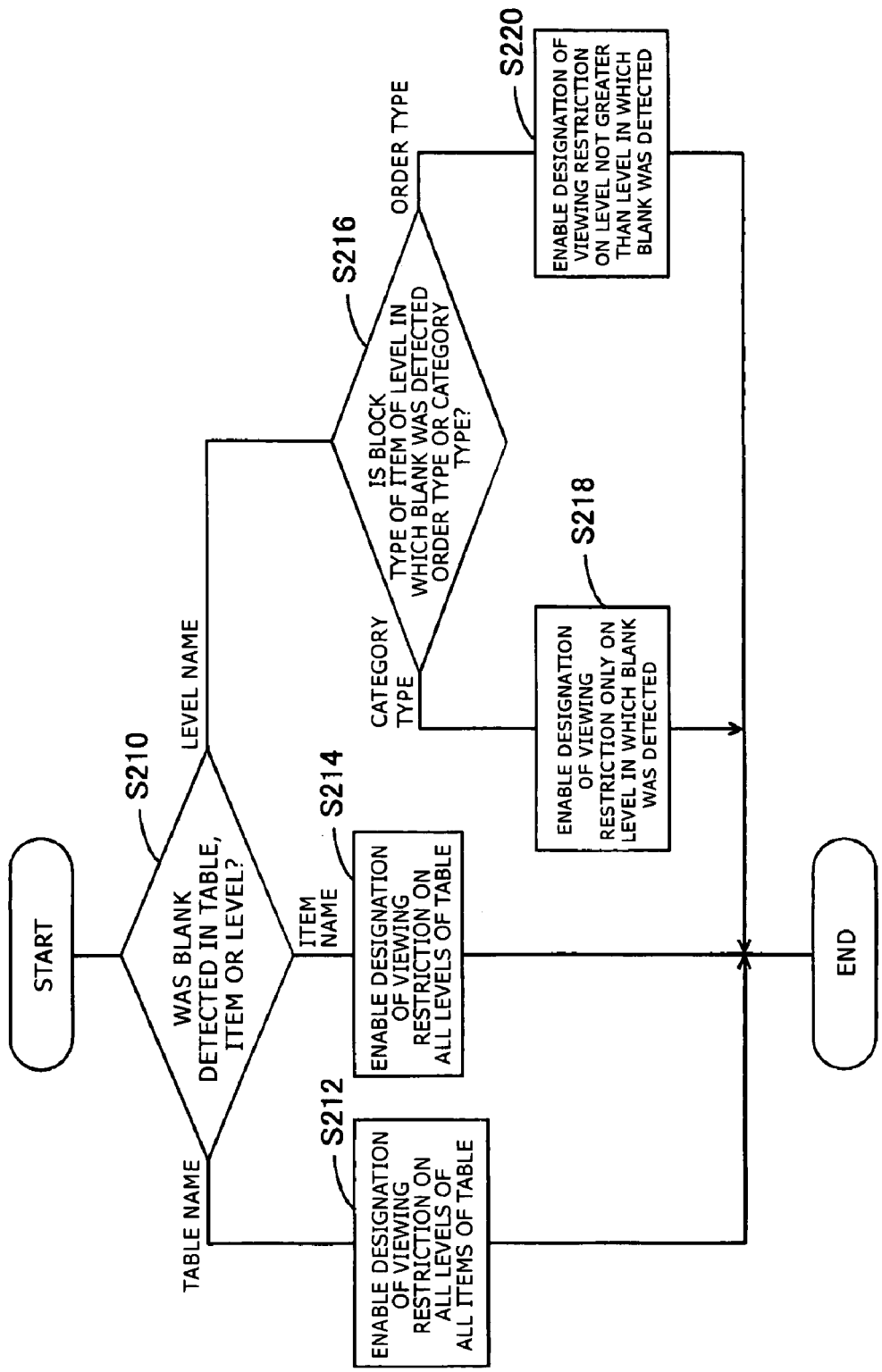
FIG. 8 is a flow chart illustrating the process of a microcomputer processing viewing restriction strengthening.

A viewing restriction strengthening process at the time of detecting a blank is described with reference to FIG. 8. FIG. 8 is a flow chart illustrating the process of the microcomputer 18 performing the viewing restriction strengthening process. The process may be executed when the conditions are not established at steps S12, S24, and S30. It is needless to say that parts where blanks are detected are memorized at steps S10 to S40 to execute the parts after the processes at steps S10 to S40 are completed.

When the process starts, a determination is made whether a blank is detected at which table, item or level name. Needless to say, it may be determined that the condition is not established at which step of the processes in FIG. 7. If the name of the table is blank, the process proceeds to step S212. If the table name is blank, the process proceeds to step S214. If the level name is blank, the process proceeds to step S216.

At step S212, flags capable of restricting viewing are attached to all the levels of all the items in the table and setting is performed so that viewing restriction can be designated and the process is terminated. In other words, if the table name is blank, a user cannot recognize that an RRT is from which region, so that the RRT may not be set at all or wrongly be set. For this reason, thus, viewing can be restricted on all the levels of all the items to allow eliminating omission of viewing restriction.

At step S214, flags capable of restricting viewing are attached to all the levels of an item to set a viewing restriction so that it can be designated and the process is terminated. In other words, if an item name is blank, a user cannot recognize that the item is used to restrict what and how, so that the RRT may not be set at all or wrongly be set. For this reason, as described above, a viewing restriction is enabled to all the levels to allow eliminating omission of viewing restriction.

At step S216, a determination is made as to whether the block type of the item of the level in which a blank is detected is the order type or the category type. If the block type of the item of the level in which a blank is detected is the category type, the process proceeds to step S218. If the block type is the order type, the process proceeds to step S220.

At step S218, flags capable of restricting viewing are attached only to the level in which a blank is detected to enable designating a viewing restriction and then process is terminated. That is to say, if the block type is the category type, there is no difference in grade between the levels, because each level merely serves to restrict the viewing of broadcast including independent key words and the like. Consequently, enabling a viewing restriction to be designated only on the level in which a blank is detected allows preventing a user from omitting setting.

At step S220, flags capable of restricting viewing are attached to all the levels lower than the level in which a blank is detected to enable designating a viewing restriction and then process is terminated. In other words, if the block type is the order type, the levels are arranged in order according to a predetermined rule. If a blank level exists, a user may probably select either of the level upper or lower than the level. If the user selects the upper level, the upper level including the blank level is set so that viewing can be restricted. However, if the user selects the lower level, the level which the user wants to select may probably be the blank level. Then, a viewing restriction can be designated on all the lower levels including the level in which a blank is detected, thereby enabling preventing a user from omitting setting.

As stated above, the microcomputer 18 executing the processes of steps S210 to S220 forms a restriction-item strengthening unit.

(5) First Modification of Process at the Time of Detecting a Blank in a Rating Region Table It is not improbable that a broadcasting station is aware that it has transmitted a broadcast wave without setting a name to the variable RRT and then forms the RRT on which a name is written and transmits it again. In that case, if the RRT is reacquired, the RRT on which a proper name is written must be able to be acquired. For this reason, in the process at the time of detecting a blank, if it is detected that any name has not been written, or if a condition is not established at any of steps S12, S22 or S28, the RRT may be reacquired.

Specifically, if a condition is not established at any of steps S12, S22 or S28, the microcomputer 18 acquires an RRT included in the TS signal of a broadcast signal corresponding to the RRT to be being processed between steps S12 to S14, steps S22 to S24 and steps S28 to S30 and rewrites the contents of the variable RRT stored in the nonvolatile memory 20.

It can be properly selected to resume processing at any of the aforementioned steps S10 to S40 after the present modification has been finished. That is to say, if a blank is detected at step S12 after the RRT has been reacquired in the present modification, the process may be resumed from step S14. If a blank is detected at step S22, the process may be resumed from step S24. If a blank is detected at step S28, the process may be resumed from step S30.

A plurality of blanks may be detected in one RRT, or RRTs reacquired several times in a short time may be the same RRT. For these reasons, the process of the present modification may be executed only if a blank is first detected in the processes of steps S10 to S40. In addition, it is possible that the time taken to acquire the variable RRT is held and reacquisition is not performed if the time is not longer than a predetermined time since the last acquisition. Time may be measured by a timer equipped on the microcomputer 18 or time information included in a signal of digital television broadcast may be used.

(6) Second Modification of Process at the Time of Detecting a Blank in a Rating Region Table It is improbable to transmit RRTs with any of the names in an RRT kept blank, so that it is less required to detect a blank and substitute it each time the RRT is acquired. For this reason, a blank may be detected and substituted with respect to the name of a level designated by the rating information when the rating information is acquired. Needless to say, the item name for the level or a blank in the table name may be simultaneously detected and substituted when a blank in the level name is detected.

Figure 9:
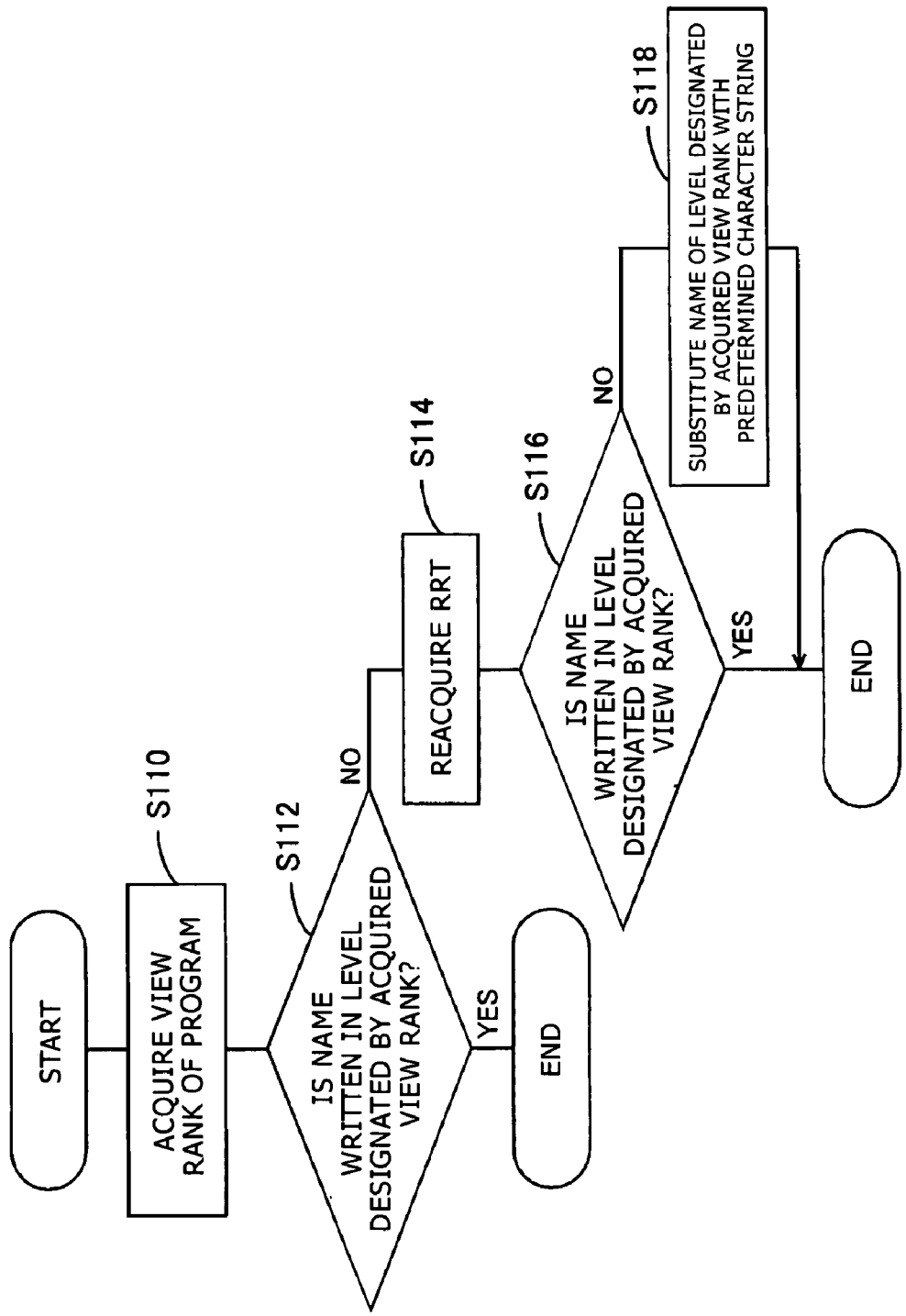
FIG. 9 is a flow chart illustrating the process of a microcomputer detecting and substituting a blank in a name when rating information is acquired.

The process of the microcomputer 18 which detects a blank in the name and performs substitution when the rating information is acquired is described with reference to the flow chart in FIG. 9.

When the process starts, the rating information of the program currently viewed is acquired at step S110 and the process proceeds to step S112. Specifically, the rating information is acquired included in the TS signal of the broadcast signal of a channel (program) currently selected.

At step S112, the level name of the item expressed by the rating information is acquired from the table expressed by the acquired rating information and a determination is made whether character information is included in the level name. If character information is detected, it is regarded that the condition is established and the process is terminated and video and audio on which viewing is restricted based on the acquired rating information are output. On the other hand, if character information is not detected, it is regarded that the condition is not established and the process proceeds to step S114. The RRT is acquired included in the TS signal of the broadcast signal of the channel currently selected and then the process proceeds to step S116.

At step S116, the level name of the item is acquired indicated by the acquired rating information in the RRT newly acquired at step S114 and a determination is made whether character information is included in the level name. If character information is detected, it is regarded that the condition is established and the process is terminated and video and audio on which viewing is restricted based on the acquired rating information and the newly acquired RRT are output. On the other hand, if character information is not detected, it is regarded that the condition is not established and the process proceeds to step S118. The level name designated by the rating information is substituted with a predetermined character string such as "Level x" (where, "x" is a level number) and then the process is terminated.

(7) Conclusion

The microcomputer 18 acquires a rating region table (RRT) from a transport steam (TS) signal and attaches a flag capable of restricting viewing to each level in the RTT based on inputs entered by a user while displaying the RTT on a screen. If rating information including the TS signal expresses the level on which the flag capable of restricting viewing is attached, viewing of a program including the rating information is restricted, a blank in the level, item and table names included in the RRT is detected and the detected blank is substituted with a predetermined character string. Thus, even if a blank exists in name portion of item in the variable RRT, a user is notified that the item in itself exists, thereby enabling preventing a user from omitting setting.

It is to be understood that the present invention is not limited to the above embodiments. Needless to say, as is readily apparent to those skilled in the art, the following are disclosed as one embodiment of the present invention:

a combination of mutually replaceable members and configuration disclosed in the present embodiments is properly changed and applied;

although not disclosed in the present embodiment, the members and configuration which are known art and disclosed in the present embodiment are properly substituted with mutually replaceable members and configuration and the combination thereof is changed and applied; and although not disclosed in the present embodiment, those skilled in the art properly substitute the members and configuration disclosed in the present embodiments with the members and configuration presumed as a substitute for the members and configuration disclosed in the present embodiments or change a combination thereof to be applied.

Although the invention has been described in considerable detail in language specific to structural features and or method acts, it is to be understood that the invention defined in the appended claims is not necessarily limited to the specific features or acts described. Rather, the specific features and acts are disclosed as preferred forms of implementing the claimed invention. Therefore, while exemplary illustrative embodiments of the invention have been described, numerous variations and alternative embodiments will occur to those skilled in the art.

In addition, reference to "first," "second," "third," and etc. members throughout the disclosure (and in particular, claims) is not used to show a serial or numerical limitation but instead is used to distinguish or identify the various members of the group.

What is claimed is:

1. A digital broadcast receiving apparatus that acquires a parental level to be set to a program of digital television broadcast to restrict viewing of the program according to the parental level, the digital broadcast receiving apparatus, comprising:
   a microcomputer that acquires a variable Rating Region Table (RRT) and a Content Advisory Descriptor (CAD) from a transport stream signal of the digital television broadcast signal to sample a predetermined information; and
   a nonvolatile memory that can memorize the variable RRT and memorizes a flag capable of restricting viewing of the RRT;
   the microcomputer determines whether character information is written in the table, item and level names in the variable RRT,
   if the table name is blank, the microcomputer sets the flags capable of restricting viewing to all the levels of all the items in the variable RRT while substituting the table name with a predetermined character string that means the table name does not exist,
   if the item name is blank, the microcomputer sets the flags capable of restricting viewing to all the levels of the item while substituting the item with a predetermined character string comprising of a combination of a character string meaning an item and a numeric value expressing an order of the item in the variable RRT, and
   if the level name is blank, the microcomputer substitutes the level name with a predetermined character string comprising of a combination of a character string meaning a level and a numeric value meaning a level number, and the microcomputer sets the flag capable of restricting viewing to the level if the block type of the item of the level is a category type, and the microcomputer sets the flag capable of restricting viewing to all the levels not greater than the level of the item if the block type of the item of the level is an order type.

2. A digital broadcast receiving apparatus that acquires a parental level to be set to a program of digital television broadcast to restrict viewing of the program according to the parental level, the digital broadcast receiving apparatus, comprising:
   a table acquiring unit that acquires a variable Rating Region Table (RRT) and a Content Advisory Descriptor (CAD) as the parental level from a digital television broadcast signal;
   a restriction-item setting unit that sets any items in the table as a restriction item based on inputs entered by a user while displaying the table on a screen;
   a restricting unit that restricts viewing of the program if the parental level of the program corresponds to the restriction item in the table and
   a blank detecting unit that detects a blank name of the item included in the table; and
   a blank substituting unit that performs at least one performance selected from the group consisting of
      a performance to set the flags capable of restricting viewing to all the levels of all the items in the variable RRT while substituting the table name with a predetermined character string that means the table name does not exist if the blank detecting unit detects the blank of the table name,
      a performance to set the flags capable of restricting viewing to all the levels of the item while substituting the item with a predetermined character string comprising of a combination of a character string meaning an item and a numeric value expressing an order of the item in the variable RRT if the blank detecting unit detects the blank of the item name, and
      a performance to substitute the level name with a predetermined character string comprising of a combination of a character string meaning a level and a numeric value meaning a level number while setting the flag capable of restricting viewing to the level if the block type of the item of the level is a category type while setting the flag capable of restricting viewing to all the levels not greater than the level of the item if the block type of the item of the level is an order type if the blank detecting unit detects the blank of the level name.

3. The digital broadcast receiving apparatus according to claim 2 further comprising a restriction-item strengthening unit that sets the restriction item to severely restrict viewing as compared with the setting of the restriction item based on inputs entered by the user if the blank detecting unit detects a blank.

4. The digital broadcast receiving apparatus according to claim 2 further comprising a restriction-item strengthening unit that sets items which the blank is detected in the table are set to the restriction item if the blank detecting unit detects a blank.

5. The digital broadcast receiving apparatus according to claim 2 further comprising a restriction-item strengthening unit that sets all the items which can be set as the restriction item to the restriction items in the table if the blank detecting unit detects a blank.

6. The digital broadcast receiving apparatus according to claim 2, wherein the table acquiring unit reacquires the table if the blank detecting unit detects a blank.

7. The digital broadcast receiving apparatus according to claim 2 further comprising a restriction-item strengthening unit that sets all the items which can be set as a restriction item in the table to the restriction item, in case that,
   if the blank detecting unit detects a blank, the table acquiring unit reacquires the table, and
   even if the table acquiring unit reacquires the table, the blank detecting unit still detects a blank.

8. The digital broadcast receiving apparatus according to claim 2, wherein
if the blank detecting unit detects a blank, the table acquiring unit reacquires the table if the blank detected by the blank detecting unit coincides with the item expressed by the parental level.

9. The digital broadcast receiving apparatus according to claim 2, wherein, the table acquiring unit, the restriction-item setting unit and the viewing restricting unit are realized by a V chip.

* * * * *